June 13, 1950     A. E. LANGENBAHN     2,511,721

SELF-REGULATING STOCK TANK

Filed Oct. 31, 1946

Inventor

*Albert E. Langenbahn*

By *Clarence A. O'Brien and Harvey B. Jacobson*
Attorneys

Patented June 13, 1950

2,511,721

UNITED STATES PATENT OFFICE 2,511,721

SELF-REGULATING STOCK TANK

Albert E. Langenbahn, Mason City, Ill.

Application October 31, 1946, Serial No. 706,873

2 Claims. (Cl. 219—38)

1

This invention relates to stock tanks as used on farms or ranches for watering livestock and it has for its primary object to provide a stock tank which is self regulating as regards the water level up to which it is filled and as regards the temperature of the water.

A further object of the invention consists in providing a self regulating stock tank having simple and effective regulating means which will permit to reduce the size of the water tank to a minimum.

A still further object of the invention consists in providing a float control for a stock tank by means of which the water level is kept constant, said control including a toggle switch operated by the said float control which itself controls the operation of a pump driving motor.

A further object of the invention consists in providing a nearly closed chamber above the tank at one end thereof which is open only at the side facing the tank and in further providing an electric heater for the water in the tank and a thermostat control for said electric heater arranged within the above mentioned closed chamber.

Still further objects will be apparent from the following detailed specification.

The invention is illustrated in the accompanying drawing showing one embodiment thereof by way of example. Although the embodiment shown is a preferred construction it is not intended to be limitative, and other modifications of my invention will permit to realize the same advantages. A departure from the preferred embodiment of my invention is therefore not necessarily a departure from the essence of the invention.

Figure 1:
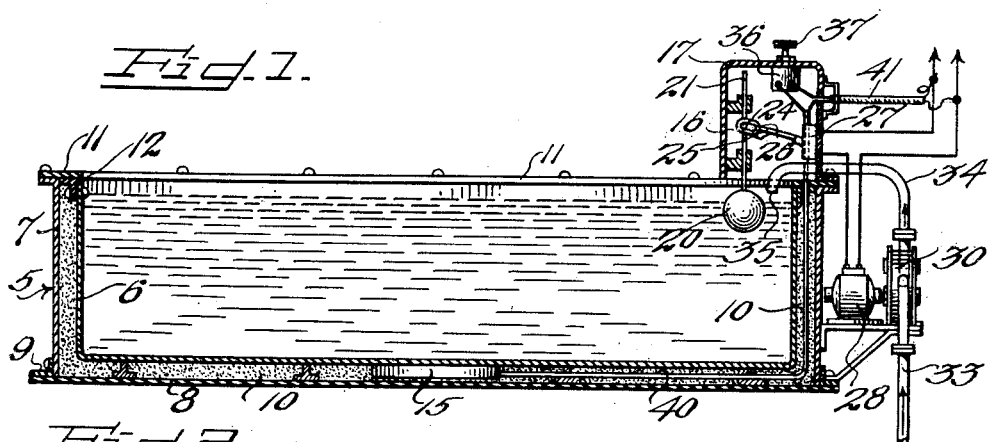
Figure 1 is a sectional elevational view of the tank according to the invention.
Figure 2:
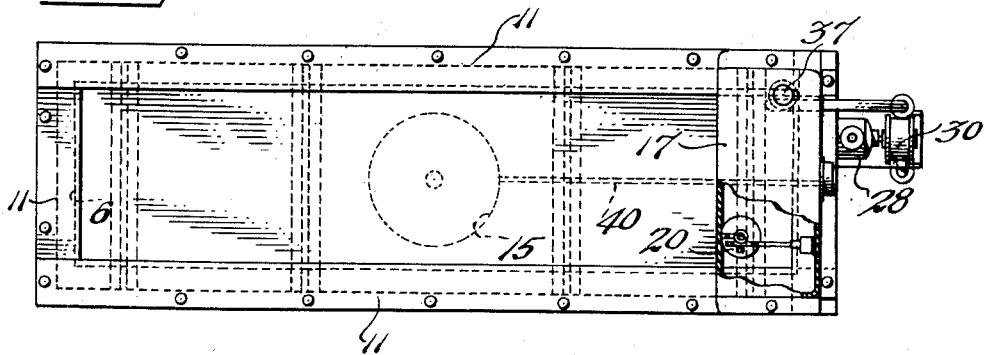
Figure 2 is a plan view thereof.
Figure 3:
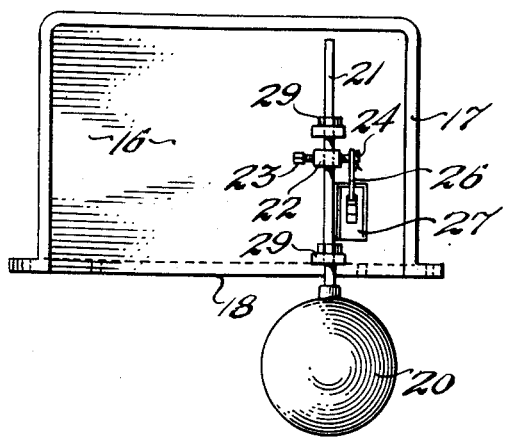
Figure 3 is an elevational view showing the float construction.
Figure 4:
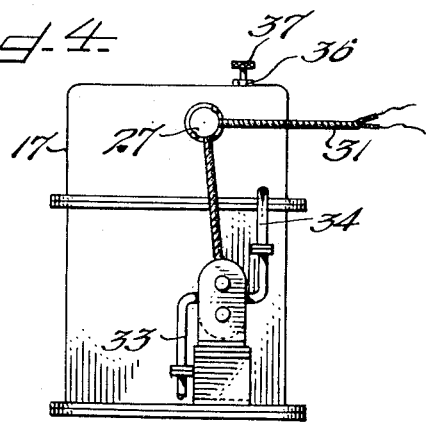
Figure 4 is an elevational side view of the tank seen from the right in Figure 1.

The stock tank comprises the water tank 6 which is spaced from an outer shell 5 surrounding it, the space between it and the tank being filled with insulation 10. The outer shell 5 is preferably made of metal and comprises lateral shell portions 7 and a metal bottom 8, which may be joined to said portion by angle irons 9. The top of the combined tank wall formed by the water tank the insulation and the outer shell is preferably covered by metal cover plates or sheets

2

11, secured to the lateral shell portion 7 by means of angle irons 12.

At the bottom of the water tank 6 an electric heater 15 is arranged, in the insulation filled space between the tank 6 and the bottom 8. The heater is in contact with the tank so as to heat the latter when operative.

At one end of the tank a closed chamber 16 is arranged within a housing 17 which is mounted transversely on one end of the tank and is merely open at its lower side 18 facing the tank.

Through this opening 18 the stem 21 of a float 20 projects which is submerged or half submerged in the water with which the tank is filled and which keeps the level of the water at a constant height. The stem may be guided in guide sleeves 29.

The stem 21 moreover carries an adjustable sleeve 22 adapted to be fixed by means of a screw 23 from which a pin 24 projects. Said pin cooperates with a bifurcated or slotted head 25 mounted at the end of a link 26 which operates a toggle switch 27. The toggle switch closes the circuit of a small electromotor 28 driving a pump 30. The current is admitted by means of a cable 31 leading to the line or to the mains of a network.

The pump 30 is of the conventional rotary character and is connected with a supply pipe 33 and a delivery pipe 34, the latter penetrating the housing 17 and having a discharge end 35 above the highest level maintained in the tank, as shown or discharging into the tank.

The housing 17 moreover contains a thermostatic device 36 which is preferably fixed to the outside wall of the housing with its adjustment screw 37 projecting outwardly, so that it can be easily operated from without. This thermostatic device controls the electric heater 15. The thermostat is preferably located in the air in the closed chamber as this location simplifies its construction. The temperature of the air in the closed chamber will always depend on the temperature of the water which is immediately beneath the chamber and the adjustment of the thermostatic device is made accordingly.

The thermostatic device 36 is connected with the line leading to the electromotor driving the pump 30, and the circuit comprises a cable 40 which is embedded within the insulating material filling the space between the tank 6 and the outer shell and which is connected with the electric tank heater 15. The heater is preferably connected in parallel to the driving electromotor by means of a cable 41.

A stock tank with controlled water level may be much smaller than a tank, the level of which is not controlled. This fact permits to heat the water to the desired temperature by means of the electric heater without large current consumption. The thermostatic device may be adjusted to a temperature above the freezing temperature and on account of the influence of the water temperature on the temperature of the air in the closed chamber the adjustment, if properly made, will always be safe. For a relative large difference of temperature between the outside air and the water which will have a tendency to cool the water rapidly, will only lead to an earlier closure of the heating circuit. Thereby freezing of the tank is safely prevented, along with water temperatures which are not safe or are below those with which the livestock should be supplied.

It is to be understood that standard types of pumps, electromotors, switches and thermostats may be used and that their specific construction is therefore not part of this invention. This applies specially to the pumps, motors and thermostats; but also the toggle switch may be replaced by other switches, such as a mercury switch which is tilted, without in any way departing from the essence of the invention.

I claim:

1. A stock tank assembly with a float controlled electrically driven water supply pump for automatic maintenance of a constant water level, comprising a water tank with an outer shell and a bottom plate spaced therefrom, insulating material filling the space between said shell and bottom plate, an electric heater arranged in contact with said bottom plate substantially in the space between said plate and said shell, an electric supply circuit for said heater, a housing structure arranged above the water level of the tank, closed on all sides, except at the bottom side which is open towards the water level, and a thermostatic device within said housing, having a heat responsive element exposed to the air within the housing, receiving its heat from the water in the tank.

2. A stock tank assembly with an electrically driven fresh water supply pump, controlled by a float and a switch operating the same for the maintenance of a constant water level within the tank, comprising a water tank with an outer shell, bottom and side plates spaced therefrom, insulating material filling the space between said shell and side and bottom plates, an electric heater arranged in contact with said bottom plate between the latter and the outer shell, a housing structure at one end of the tank, above the water level, closed on all sides, except at the bottom side turned towards the water level, which is open, said housing enclosing a float and the switch controlling the pump, and a thermostatic device mounted within said housing on the wall of said housing, said device being provided with a heat responsive element, arranged in the interior and exposed to the air within the housing, receiving its heat from the water and further provided with an adjustment device, passing through the wall of the housing and projecting outwardly.

ALBERT E. LANGENBAHN.

REFERENCES CITED

The following references are of record in the file of this patent:

UNITED STATES PATENTS

| Number | Name | Date |
|---|---|---|
| 792,237 | Reeve | June 13, 1905 |
| 1,569,738 | Forshee | Jan. 12, 1926 |
| 1,695,846 | Harding | Dec. 18, 1928 |
| 2,133,388 | Henderson | Oct. 18, 1938 |
| 2,162,314 | Perri | June 13, 1939 |
| 2,230,085 | Ortgiesen | Jan. 28, 1941 |